Nov. 4, 1930.   E. J. SVENSON   1,780,606
TOOL SUPPORT FOR LATHES
Filed March 28, 1929
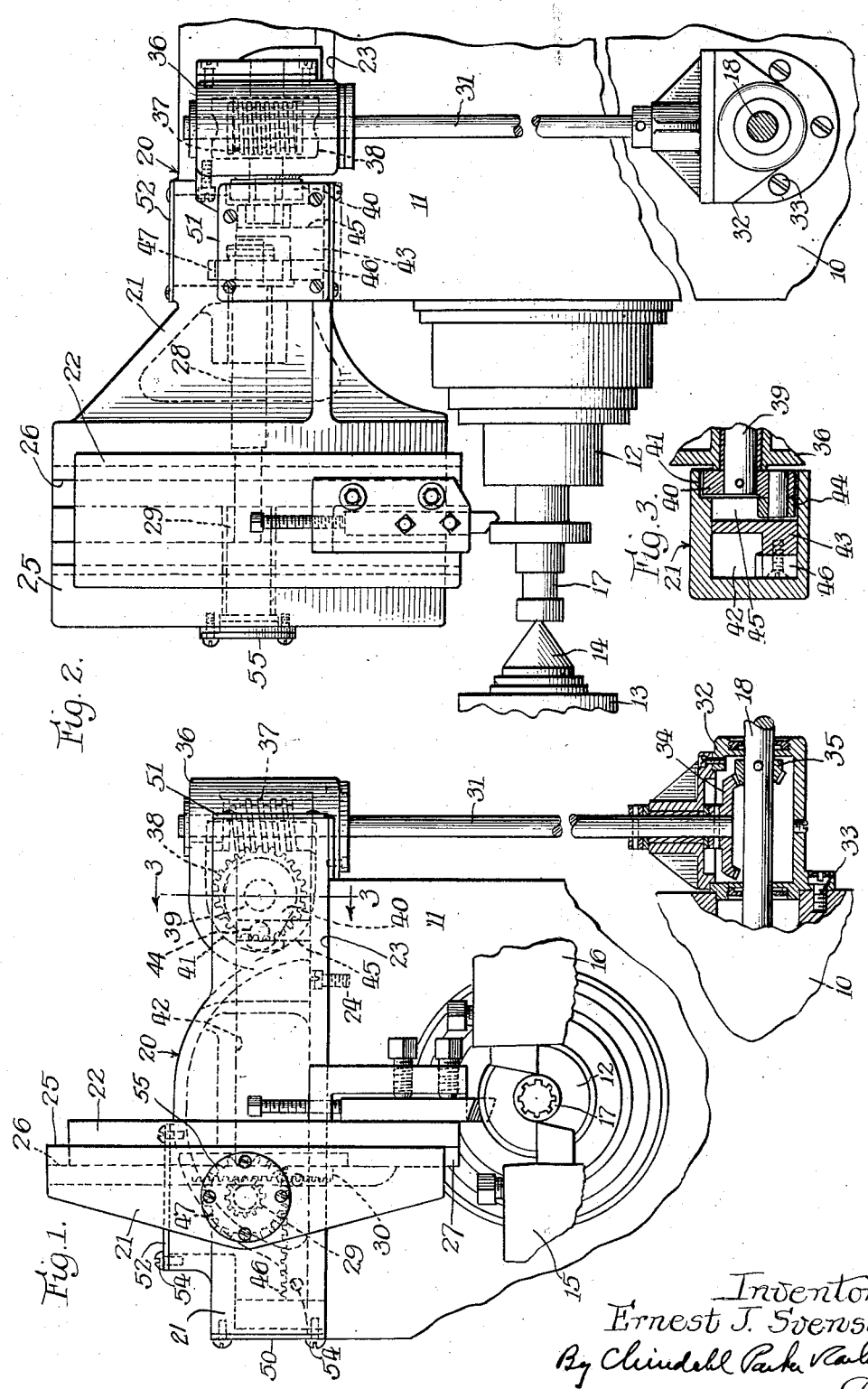
Inventor:
Ernest J. Svenson,
By Chindahl Parker Carlson
Attys.

Patented Nov. 4, 1930

1,780,606

UNITED STATES PATENT OFFICE

ERNEST J. SVENSON, OF ROCKFORD, ILLINOIS, ASSIGNOR TO SUNDSTRAND MACHINE TOOL CO., OF ROCKFORD, ILLINOIS, A CORPORATION OF ILLINOIS

TOOL SUPPORT FOR LATHES

Application filed March 28, 1929. Serial No. 350,476.

The invention relates generally to lathes and more particularly to a tool carrying attachment therefor.

The primary object of the invention is to provide an attachment adapted to be readily mounted on the headstock of a standard lathe and carrying a slide for supporting an auxiliary tool or gang of tools above the work for reciprocation toward and away from the work, and embodying actuating means for the auxiliary tool slide adapted to be connected to the feed mechanism of the lathe.

Other objects and advantages will become apparent from the following description taken in connection with the accompanying drawings illustrating the preferred embodiment of the invention and in which:

Figure 1 is a fragmentary elevational view looking at the left-hand end of the lathe headstock shown in Fig. 2, embodying the preferred form of the invention.

Fig. 2 is a fragmentary rear elevational view of the lathe shown in Fig. 1.

Fig. 3 is a fragmentary sectional view taken along the line 3—3 of Fig. 1.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the form illustrated, the invention is embodied in a lathe of the general type illustrated in my copending application, Serial No. 245,168, filed January 7, 1928, having a bed 10, a headstock 11 with a rotatable horizontal spindle 12 therein and a tailstock 13 with a rotatable horizontal spindle 14 therein axially alined with the headstock spindle 12. Front and rear tool holders 15 and 16 are mounted on the lathe bed 10 in any suitable and well-known manner for horizontal movement toward and away from a work piece 17 which is supported for rotation between the spindles 12 and 14.

The tool holders 15 and 16 may be automatically actuated toward and away from the work in timed relation to each other by means of a feed mechanism (not herein shown) so as to impart the desired feed and rapid traverse movements to the tool holders. This mechanism may be of the type shown in my copending application and includes, in the present instance, a shaft 18 extending out of the rear side of the lathe bed 10 beneath the headstock 11. Preferably said shaft is operatively connected to the feed mechanism of the lathe to rotate in opposite directions as the tool holders 15 and 16 are advanced to and withdrawn from the work.

In order that turning, facing or chamfering operations may be performed in addition to those operations ordinarily performed by the standard front and rear tools, the invention provides an auxiliary tool support 20 embodying in this instance a hollow base 21 secured on the top of the headstock and carrying a slide 22 on a portion which projects over the spindle 12. The headstock 11 is preferably formed with a flat upper surface 23 upon which the base 21 is secured by screws 24. The base 21 has a vertical surface 25 having a dove-tail groove 26 formed therein to engage complemental ways 27 on the tool slide 22 so that the slide is guided for movement toward and away from the work piece supported by the spindles 12 and 14 substantially radially. During such movement the slide 22 and the tool or tools carried thereby are out of the way of the front and rear tool holders so that tools carried by the two standard holders and by the slide 22 may operate on the work at the same time and thus reduce the total time required for the completion of a work piece.

The auxiliary tool slide 22 is preferably actuated automatically in timed relation to the tool holders 15 and 16 by means carried in part by the base 21 and extending downwardly along the rear side of the headstock 11, so as to be out of the way of the operator, and adapted to be connected to a reversely driven element of the feed mechanism of the lathe which drives the two tool holders 15 and 16 herein shown as the shaft 18.

The actuating mechanism for the auxiliary tool slide 22 preferably comprises a shaft 28 rotatably mounted in the base 21 so as to be parallel to the lathe spindles 12 and 14 and at its outer end the shaft has a pinion 29 engaging a rack 30 secured on the slide 22 parallel to its path of reciprocation. Thus when the shaft 28 is rotated the slide 22 will be moved toward or away from the work in accordance with the direction of rotation of the shaft.

The power transmitting connection between the feed mechanism of the lathe and shaft 28 is formed by means mounted on the support 20 on top of the lathe headstock and driven by a shaft 31 rotatably mounted in a substantially vertical position along the rear side of the headstock. The lower end of the shaft 31 extends into and is rotatably journaled in a support or housing 32 adapted to be detachably secured on the lathe frame by bolts 33 in adjacent or surrounding relation to the shaft 18 of the lathe feed mechanism. Within the housing 32 the shaft 31 carries a bevel gear 34 adapted to mesh and be driven by a companion gear 35 secured on the shaft 18.

The upper end of the shaft 31 is rotatably mounted in a support or housing 36 which is secured to the headstock and forms a part of the support 20. The housing 36 is, in the present instance, mounted on the top of the headstock so as to project rearwardly therefrom and is formed separately from the base 21.

Within the housing 36 a worm 37 is secured on the vertical shaft 31 to engage and drive a worm wheel 38 mounted on a horizontal rock shaft 39 positioned parallel to the shaft 28 and journalled in the opposite walls of the housing 36. One end of the rock shaft 39 projects out of the housing 36 and has a crank arm 40 secured thereon, the arm 40 extending into a recess 41 formed in the base 21. This recess opens into a chamber 42 formed in the base 21 and extending from front to rear of the headstock 11.

A bar 43 is slidably positioned within the chamber 42 and a roller or pin 44 on the end of the crank arm 40 engages a vertical slot 45 formed in the bar 43 so that when the shaft 39 is rocked back and forth by the rotation of the shaft 18 in opposite directions, the bar 43 will be reciprocated transversely of the shaft 28. A rack 46 secured on the forward end of the slide bar 43 meshes with a pinion 47 on one end of the shaft 28 so that by reciprocating the slide bar 43 the tool slide 22 will be moved toward and away from the work.

To render the parts of the actuating mechanism easily accessible, the two ends and top of the chamber 42 may be closed by removable walls 50, 51 and 52 secured in position by screws 54. Removal of the plate 52 permits removal of the gear wheel 47. A removable plate 55 may be secured on the outer end of the base 21 to hold the shaft 28 in proper longitudinal position. Upon removal of the plate 55 the shaft 28 may be withdrawn.

In the usual set-up of a lathe of the character contemplated, the feed or actuating mechanism for the tool supports is arranged to advance and retract the supports, during which movement an element of the feed mechanism such as the shaft 18 is driven in forward and reverse directions corresponding to the direction of movement of the supports.

The slide actuating means is arranged to utilize the various automatically controlled tool movements usually provided in lathes of the character contemplated and to this end the gearing between the shaft 18 and the rock shaft 39 is preferably arranged so that the total rotative movement of the shaft 18 in one direction will cause rocking movement of the shaft 39 through slightly more than 180° so that for an exemplary set-up of the lathe the crank arm 40 will be moved in a clockwise direction to the position shown in Fig. 1.

As the crank arm 40 approaches the position shown in Fig. 1, the rate of movement of the tool slide will be gradually reduced and by arranging the parts so that in the tool advancing movement the arm 40 is moved slightly beyond its horizontal position, the tool slide 22 will be caused to dwell in its innermost position, thus assuring perfect finishing of the work piece.

From the foregoing it will be apparent that the invention provides a tool carrying attachment which may be readily secured in an operative position on a standard lathe so as to augment the tools normally carried by the lathe by performing additional cutting operations during the same operating period, thus making it possible to produce work pieces requiring an exceedingly large number of varied cuts without re-chucking the work or changing tools. By this arrangement the accuracy of the finished work piece is assured.

It will also be apparent that the invention provides an advantageous actuating mechanism for the auxiliary tool slide since it is arranged for connection with the actuating or feed mechanism of the lathe to which it is attached and takes advantage of the varying automatically controlled tool movements usually obtained thereby. It will also be noted that this connection between the auxiliary slide and the lathe actuating mechanism is arranged so that it may be made exteriorly of the lathe frame without material disassembly of the lathe and in a location wherein the parts are out of the way of the operator.

I claim as my invention:—

1. An auxiliary tool attachment for lathes comprising, in combination, a base adapted to be secured on the top of a lathe headstock and arranged to project over a work piece supported by the headstock spindle of the lathe, a tool slide mounted on said base for movement substantially radially toward and away from such a work piece, and means for actuating said slide comprising a shaft rotatably mounted in said base parallel to said spindle and having one end operatively geared to said slide to move the same when the shaft is rotated, a pinion on the other end of said shaft, a rack engaging said pinion mounted in said base for sliding movement transversely of said shaft, a substantially vertical drive shaft extending downwardly along the rear side of the headstock adapted for connection at its lower end with the lathe feed mechanism and carrying a worm at its upper end, a worm wheel meshing with said worm, and an arm rotating with said worm having at its outer end a pin and slot connection with said rack.

2. An attachment for lathes comprising, in combination, a detachable support embodying a base adapted to be secured on the top of a lathe headstock having a portion arranged to project horizontally therefrom over a work piece supported for rotation in the lathe, a tool slide mounted on said projecting portion for reciprocation toward and away from such a work piece, a shaft rotatably mounted in said portion and having one end operatively geared to said slide, a pinion on the other end of said shaft, a rack engaging said pinion and mounted in said base for sliding movement transversely of said shaft, a rock shaft rotatably mounted on said support transversely of the rack, a crank on said rock shaft having a pin and slot connection with said rack whereby to actuate said rack when said shaft is rocked, and gearing carried on said support connected to said rock shaft and adapted to be driven by the feed mechanism of the lathe.

3. An auxiliary tool supporting attachment for lathes having a headstock, rotatable work supporting means, tool supports and actuating mechanism therefor, said attachment comprising a base adapted to be secured on the top of the lathe headstock so as to project horizontally therefrom over the work supporting means, a tool slide mounted on the projecting portion of said base for reciprocation toward and away from a work piece supported by said means, a first shaft mounted in said base having one end operatively geared to said slide, a pair of supports, one adapted to be secured at the top of the headstock and the second adapted to be secured on the side of the lathe, a second shaft rotatably mounted in said supports, gearing carried by said second support and forming a driving connection between said second shaft and the feed mechanism of the lathe, and means carried by said base and said first support operatively connecting said second and first shafts.

4. An auxiliary tool supporting attachment for lathes having a headstock, rotatable work supporting means, horizontally movable tool supports and actuating mechanism therefor, said attachment comprising a base adapted to be secured on the top of the lathe headstock so as to project horizontally therefrom over the work supporting means, a tool slide mounted on the projecting portion of said base for vertical reciprocation substantially radially toward and away from a work piece supported by said means, a first shaft mounted in said base having one end operatively geared to said slide, a pair of supports, one adapted to be secured at the top of the headstock and the second adapted to be secured on the side of the lathe, a second shaft rotatably mounted in said supports, gearing carried by said second support and forming a driving connection between said second shaft and the feed mechanism of the lathe, and means carried by said base and said first support operatively connecting said second and first shafts.

5. An auxiliary tool supporting attachment for lathes having a headstock, rotatable work supporting means, tool supports and actuating mechanism therefor, said attachment comprising a support embodying a base adapted to be secured on the top of the lathe headstock so as to project horizontally therefrom over the work supporting means, a tool slide mounted on the projecting portion of said base for reciprocation toward and away from a work piece supported by said means, a first shaft mounted in said base having one end operatively geared to said slide, a second shaft rotatably mounted in said support adjacent the rear side of the headstock, means connected to said second shaft and extending downwardly along the rear side of the headstock to form a driving connection between said second shaft and the feed mechanism of the lathe, and means carried by said support operatively connecting said second and first shafts.

6. An auxiliary tool attachment adapted for use with a lathe having a bed with an upstanding headstock, rotatable work supporting means, and a reversible feed shaft mounted in and projecting transversely out of said bed, said attachment comprising a support including a base adapted to be detachably secured on the top of said headstock so as to project therefrom over said work supporting means, a tool slide mounted on the projecting portion of said base for reciprocation substantially radially toward and away from a work piece supported by said means, and actuating means for reciprocating said slide including a member movably mounted in said base and operatively connected to said slide for reciprocating the same, said member extending from said projecting portion of the base into the portion of the base lying above said headstock, a shaft rotatably mounted in said support above said headstock and having a speed reducing connection with said movable member, and means adapted to operatively connect said shaft and the reversible feed shaft of the lathe.

In testimony whereof, I have hereunto affixed my signature.

ERNEST J. SVENSON.